Dec. 5, 1967  M. I. TAYLOR ETAL  3,355,889
MOVABLE POWER PLANT FOR DIRECT LIFT AND FORWARD PROPULSION
Filed Nov. 15, 1965  3 Sheets-Sheet 1

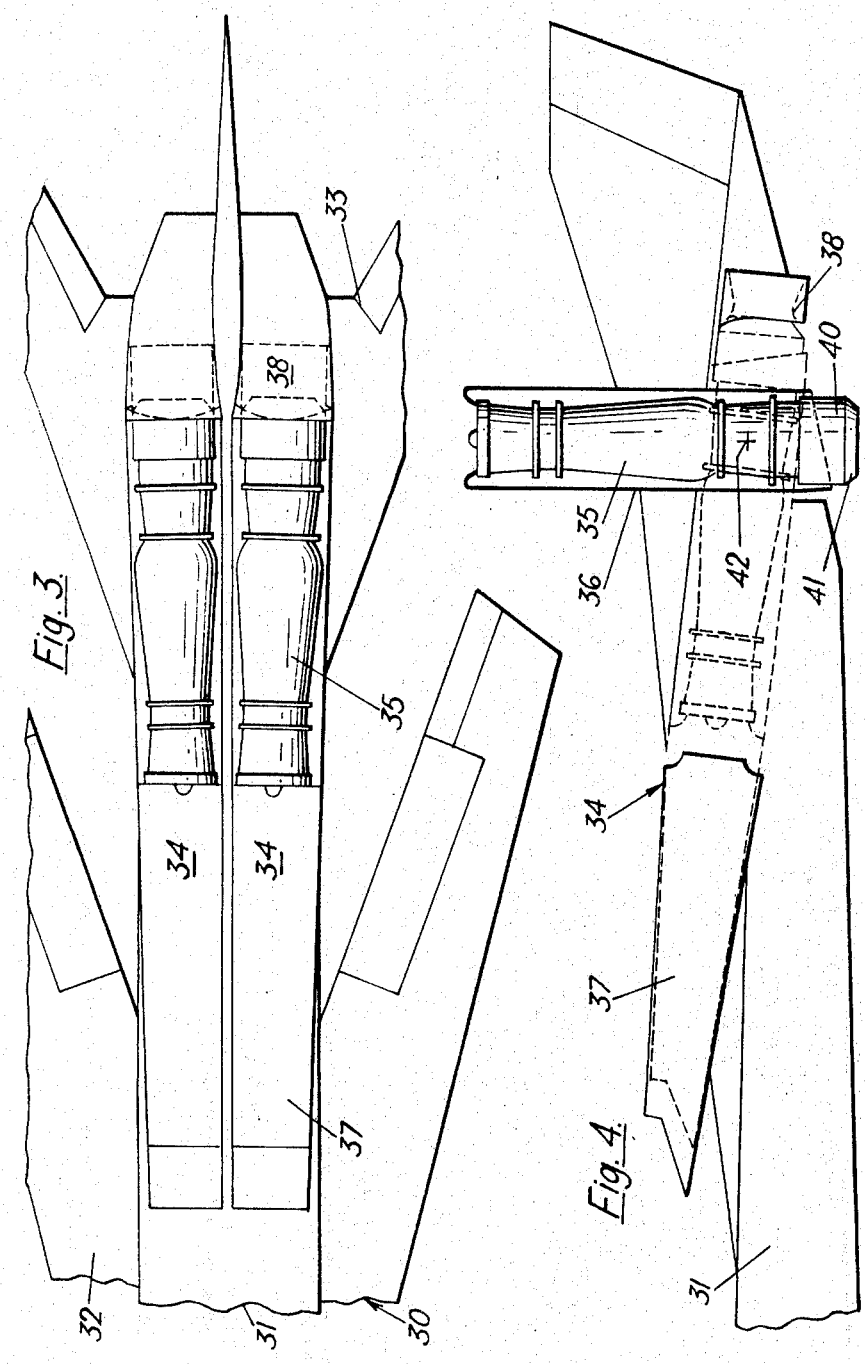

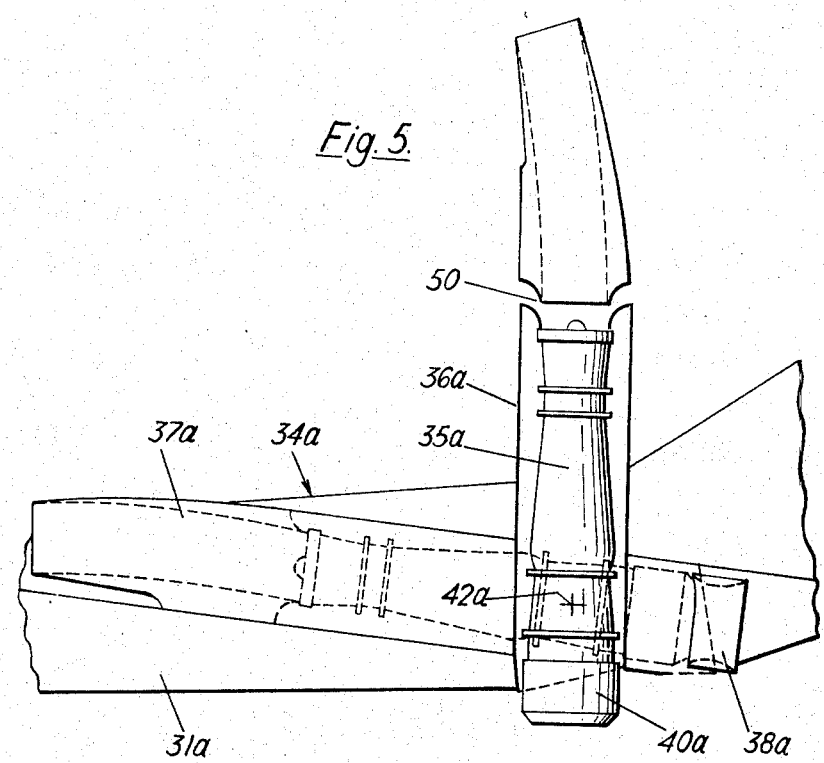
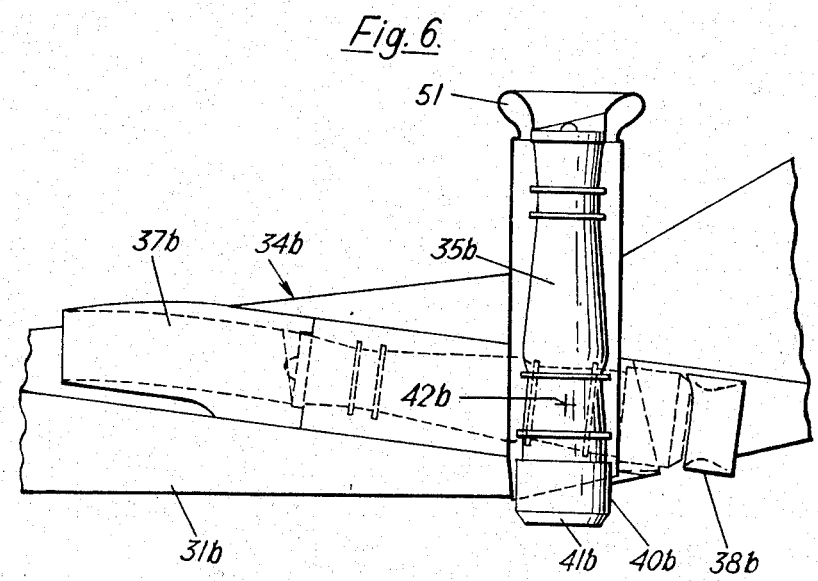

United States Patent Office 3,355,889
Patented Dec. 5, 1967

3,355,889
MOVABLE POWER PLANT FOR DIRECT LIFT AND FORWARD PROPULSION
Maurice Ian Taylor and Addison Charles Maguire, Derby, England, assignors to Rolls-Royce Limited, Derby, England, a British company
Filed Nov. 15, 1965, Ser. No. 507,795
Claims priority, application Great Britain, Nov. 27, 1964, 48,433/64
7 Claims. (Cl. 60—228)

ABSTRACT OF THE DISCLOSURE

A power plant has a pivotable jet engine which may be moved between a forward propulsion position, in which its exhaust pipe communicates with a fixed jet pipe, and a vertical position in which it is out of communication with said jet pipe and provides direct lift. In its forward propulsion position the upstream end of the engine mates with a supersonic intake. The intake may be fixed, in which case the upstream end of the engine may have an inflatable intake for use when the engine is vertical, or the intake may rotate with the engine into the vertical position, in which case it is moved axially relative to the engine to provide a lateral intake when the engine is vertical.

---

Figure 1:
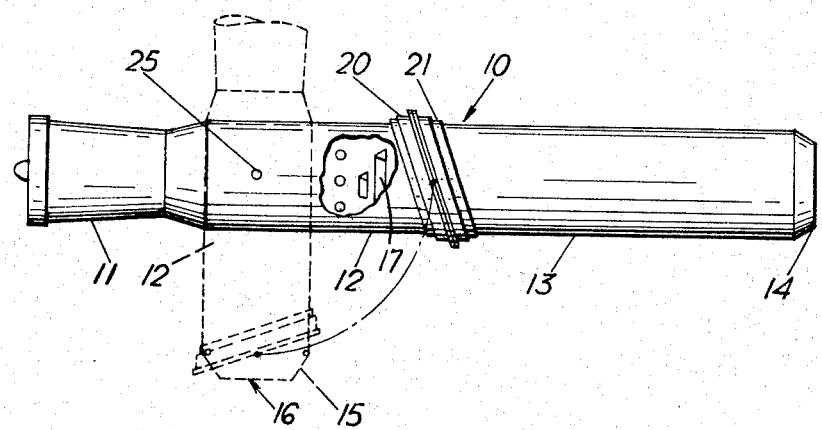

This invention concerns power plant and aricraft provided therewith.

According to the present invention there is provided power plant comprising a jet propulsion engine having an exhaust pipe provided at its downstream end with a first propulsion nozzle, and a jet pipe provided at its downstream end with a further propulsion nozzle, the engine, with its exhaust pipe, and said jet pipe being relatively movable to place the upstream end of the jet pipe into and out of communication with said first propulsion nozzle, whereby exhaust gases from the engine may be exhausted through said further propulsion nozzle or said first propulsion nozzle.

Preferably the first propulsion nozzle is variable in area, means being provided for expanding and contracting the first propulsion nozzle when it is respectively in and out of communication with said jet pipe.

The exhaust pipe, jet pipe and first propulsion nozzle, in its expanded condition, may be of substantially the same size.

In a preferred embodiment the first propulsion nozzle is adapted to seal against the upstream end of the jet pipe. Additional sealing means may be provided between the exhaust pipe and the jet pipe.

In a preferred embodiment of the invention the engine is a gas turbine engine, reheat combustion equipment being provided therein. A preferred gas turbine engine is that of the by-pass type, there being provided in the by-pass duct thereof combustion equipment, the combustion gases from which may pass through said first propulsion nozzle, and there being provided in said jet pipe reheat combustion equipment the combustion gases from which may pass through said further propulsion nozzle.

The engine and exhaust pipe may be pivotally mounted about an axis disposed at right angles to the axis of the jet pipe for rotation relative to said jet pipe.

The power plant may be adapted for supersonic flight and may, for this purpose, be provided with a supersonic air intake with which the engine communicates when in communication with the jet pipe.

The intake may be removable axially into and out of engagement with said engine but is otherwise fixed relative to said jet pipe, the engine and exhaust pipe being movable relative both to said jet pipe and said air intake.

Alternatively the supersonic air intake may be movable axially with respect to the engine and may be rotatable therewith relative to the jet pipe, the axial spacing between the intake and engine in its extended position providing an additional air intake to said engine.

The engine may alternatively be provided with an inflatable intake, means being provided for inflating said inflatable intake when the engine is out of communication with said jet pipe.

The invention also includes an aircraft provided with power plant as set forth above. Thus the aircraft may be adapted for V.T.O.L., or S.T.O.L., (i.e. vertical take-off and landing, and short take-off and landing), the engine and exhaust pipe being movable between positions for providing forward propulsive thrust through said further propulsion nozzle and direct vertical thrust through said first propulsion nozzle.

In a preferred embodiment the aircraft is provided with two such power plants mounted side-by-side in the fuselage.

Figure 2:
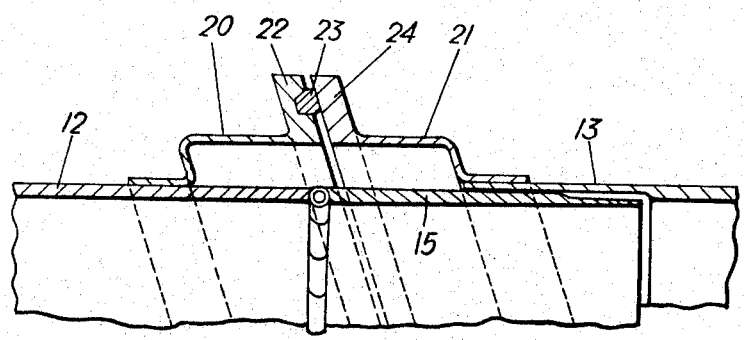

The invention is illustrated, merely by way of example, in the accompanying drawings, in which:

FIGURE 1 is an elevation of power plant according to the present invention, with parts broken away, FIGURE 2 is a part-sectional elevation of part of the power plant of FIGURE 1, FIGURE 3 is a plan view of part of an aircraft provided with two power plants according to the present invention, FIGURE 4 is a sectional view of the aircraft of FIGURE 3, with the components in different relative positions, FIGURE 5 is a view corresponding to that of FIGURE 4 showing an alternative embodiment of the present invention, and FIGURE 6 is a view similar to FIGURE 5 showing yet a further embodiment of the present invention.

Referring to the drawings, there is shown in FIGURES 1 and 2 power plant 10 comprising a gas turbine jet propulsion engine 11 of the by-pass type provided with an exhaust pipe 12 and a jet pipe 13 terminating in a propulsion nozzle 14. As seen more clearly in FIGURE 2, the downstream end of exhaust pipe 12 is provided with a plurality of plates 15 which are pivotally mounted at their upstream ends to the downstream end of the exhaust pipe 12 and are pivotable to provide a variable area propulsion nozzle 16 at the downstream end of exhaust pipe 12. Means (not shown) are provided for moving the plates 15 about their pivots. The plates 15 are movable between the position shown in broken lines in FIGURE 1, in which they contact the area of the propulsion nozzle 16 and the position shown, for example, in FIGURE 2 in which they are expanded so as to be aligned with the exhaust pipe 12 and form a smooth extension of the same. It will be noted from FIGURE 2 that exhaust pipe 12, the plates 15 in their expanded position, and the jet pipe 13 are all of substantially the same diameter and thus, in the position shown in full lines in FIGURE 1 and as shown in FIGURE 2 these members 12, 13, 15, together form a smooth exhaust duct for the gases from the engine 11. In this position the plates 15 also seal against the upstream end of the jet pipe 13 as shown in FIGURE 2, the downstream ends of the plates 15 abutting and sealing with the upstream end of jet pipe 13.

Additional sealing means are provided between the exhaust pipe 12 and jet pipe 13 in that annular flanges 20, 21 are provided on the downstream end of exhaust pipe 12 and on the upstream end of jet pipe 13 respectively. An annular portion 22 of the flange 20 supports a sealing ring 23 which, in the position shown in FIGURE 2, abuts and seals against an annular portion 24 of the annular flange 21. As clearly seen in FIGURES 1 and 2, this additional sealing device formed by annular flanges 20, 21, annular portions 22, 24 and the sealing ring 23 are all disposed in planes parallel with one another and disposed obliquely with respect to a transverse plane through the power plant.

Engine 11 is pivotally mounted about a pivot 25 and means (not shown) are provided for moving the engine with its exhaust pipe 12 from the full line position shown in FIGURE 1 to the broken line position. In the full line position, the downstream end of exhaust pipe 12 seals with the upstream end of jet pipe 13 (as shown in detail in FIGURE 2) and, in the broken line position shown in FIGURE 1, the exhaust pipe 12 is out of communication with the jet pipe 13. The means for pivoting the engine 11 with its jet pipe 12 about pivot point 25 may co-operate with the means for moving the plates 15 between their expanded and contracted positions whereby, when the engine 11 with jet pipe 12 is in the full line position shown in FIGURE 1, the plates 15 are in their expanded position as shown in FIGURE 2 and, when the engine 11 with its exhaust pipe 12 is disposed in the broken line position of FIGURE 1, the plates 15 are in their contracted position.

With this arrangement, exhaust gases from the engine are exhausted through exhaust pipe 12 and jet pipe 13 and therefore through propulsion nozzle 14 when the engine is in the full line position shown in FIGURE 1. When the engine is in the broken line position shown in FIGURE 1 exhaust gases are exhausted through exhaust pipe 12 and propulsion nozzle 16.

It will be appreciated that such a propulsion unit may be mounted on an aircraft adapted for V.T.O.L., and S.T.O.L., the full line position of FIGURE 1 being employed for forward propulsion, and the broken line position of FIGURE 1 being employed for V.T.O.L., or S.T.O.L. The increased length of exhaust piping employed in the forward propulsion position enables efficient use of reheat combustion equipment disposed within the engine 11 to be utilised thereby providing increased thrust. By leaving the jet pipe 13 static, and by rotating only the engine 11 and the exhaust pipe 12, increased ground clearance is obtainable and, of course, smaller and less bulky actuating means are required to move the engine 11 and exhaust pipe 12 between the two positions shown in FIGURE 1.

Combustion equipment may be disposed within the by-pass duct of the engine and may be employed in the broken line position of FIGURE 1, i.e. for V.T.O.L., or S.T.O.L., the combustion gases from this combustion equipment passing through the propulsion nozzle 16, while reheat combustion equipment 17 is disposed within the exhaust pipe 12 and may be used in the full line position of FIGURE 1, i.e. for forward propulsion, the combustion gases from the reheat combustion equipment passing through the propulsion nozzle 14. With this arrangement, increased thrust can be provided for take-off, landing and forward propulsion.

Referring now to FIGURES 3 and 4, there is shown an aircraft 30 provided with power plant according to the present invention. The aircraft 30 comprises fuselage 31, swept back wings 32 and tail plane 33. Two power plants 34 are disposed side-by-side within the aircraft fuselage 31.

Each power plant 34 comprises a gas turbine jet propulsion by-pass engine 35 housed within a fairing 36, a supersonic air intake 37, and a jet pipe 38 of divergent shape. Engine 35 is provided with an exhaust pipe 40 having a convergent nozzle 41 at its downstream end, the engine 35 together with the exhaust pipe 40 being pivotally mounted about a pivot 42 for movement between the full line position and the dotted line positions of FIGURE 4.

With the engine 35 in the broken line position of FIGURE 4, the convergent nozzle 41 mates with the jet pipe 38 to form a convergent/divergent exhaust nozzle suitable for supersonic flight. Thus the convergent nozzle 41 is not variable in area and remains in the convergent position (unlike the nozzle 15 of FIGURES 1 and 2) and this together with the divergent nozzle of jet pipe 38 constitutes the convergent/divergent supersonic exhaust nozzle.

The supersonic air intake 37 is movable axially with respect to the remainder of the power plant between the full line position shown in FIGURE 4 and the broken line position of FIGURE 4, in the latter position of which it seals against the upstream end of engine 35. Thus in the broken line position of FIGURE 4, the power plant is adapted for supersonic flight in forward propulsion, air for the engine being taken in through the air intake 37 and being exhausted through the supersonic convergent/divergent nozzle formed by nozzle 41 and jet pipe 38.

Means (not shown) are provided for rotating engine 35 with its exhaust pipe 40 and convergent nozzle 41 between the dotted line position of FIGURE 4 and the full line position thereof in which it is disposed substantially vertically to provide direct vertical thrust for V.T.O.L., or S.T.O.L. In the full line position, exhaust gases from the engine 35 are exhausted through the convergent nozzle 41, these gases being subsonic for V.T.O.L., or S.T.O.L. Prior to movement of the engine between the dotted line and full line positions of FIGURE 4, the air intake 37 is moved axially from the dotted line to the full line positions to disconnect the air intake from the engine and thereby permit the relative rotary movement required.

The engine 35 may be provided with reheat combustion equipment and with by-pass combustion equipment as described with reference to the embodiment of FIGURES 1 and 2.

Referring now to FIGURE 5, the arrangement disclosed is substantially identical with that described with reference to FIGURES 3 and 4 but, in this embodiment, an air intake 37a is employed which is rotatable with engine 35a to the direct vertical thrust position. However, the intake 37a is still axially movable with respect to the engine 35a and, as shown in FIGURE 5 in the vertical position the intake 37a may be moved axially away from engine 35a to provide an annular air intake 50 through which air may be drawn into the engine for direct vertical thrust operation.

Referring to FIGURE 6, the embodiment disclosed in this figure is substantially identical with that disclosed in FIGURES 3 and 4 and will not for this reason be described in detail. However, unlike the embodiment of FIGURES 3 and 4, the engine 35 is provided at its forward end with an inflatable air intake 51 which may be inflated when the engine is in its vertical position to provide a more suitable air intake duct for V.T.O.L., and S.T.O.L. operation.

We claim:

1. Power plant comprising a jet propulsion engine having a supersonic air intake which is movable axially into and out of engagement with the engine, an exhaust pipe, a first propulsion nozzle mounted at the downstream end of the exhaust pipe, a jet pipe, and a further propulsion nozzle mounted at the downstream end of the jet pipe, the engine, with its exhaust pipe, being movable relative to said jet pipe to dispose the engine selectively in a first position in which air is drawn into the engine through said air intake and exhaust gases from the engine are exhausted through the further propulsion nozzle and a second position in which the intake is inoperative and the exhaust gases from the engine are exhausted through the first propulsion nozzle.

2. Power plant as claimed in claim 1 wherein said intake is movable axially relative to the jet pipe but is otherwise fixed relative to said jet pipe.

3. Power plant as claimed in claim 1 wherein said engine is a gas turbine engine, and reheat combustion equipment is provided therein.

4. Power plant as claimed in claim 1 wherein the engine is a by-pass gas turbine engine, there being provided in the by-pass duct thereof combustion equipment the combustion gases from which may pass through said first propulsion nozzle, and there being provided in said jet pipe reheat combustion equipment the combustion gases from which may pass through said further propulsion nozzle.

5. Power plant as claimed in claim 1 wherein said engine and exhaust pipe are pivotally mounted about an axis disposed at right angles to the axis of said jet pipe for rotation relative to said jet pipe.

6. Power plant comprising a jet propulsion engine having an exhaust pipe, a first propulsion nozzle mounted at the downstream end of the exhaust pipe, means for varying the area of the first propulsion nozzle, a jet pipe, and a further propulsion nozzle mounted at the downstream end of the jet pipe, the engine, with its exhaust pipe, and said jet pipe being relatively movable to place the upstream end of the jet pipe into and out of communication with said first propulsion nozzle, whereby exhaust gases from the engine may be selectively exhausted through said further propulsion nozzle and through said first propulsion nozzle respectively, said exhaust pipe and said jet pipe being provided with respective external annular flanges which sealingly engage each other, and said means for varying the area of the first propulsion nozzle sealingly engaging the jet pipe when the exhaust pipe is in communication with the jet pipe.

7. Power plant as claimed in claim 6 wherein a sealing ring is carried by one of said annular flanges and engages a plane surface on the other annular flange when the exhaust pipe is in communication with the jet pipe.

References Cited

UNITED STATES PATENTS

| | | | |
|---|---|---|---|
| 2,948,111 | 8/1960 | Nelson | 137—15.1 |
| 2,999,656 | 9/1961 | Ward | 60—232 |
| 3,023,981 | 3/1962 | Reiniger | 244—12 |
| 3,154,916 | 11/1964 | Eichholtz | 60—228 |

FOREIGN PATENTS 1,086,560   8/1960   Germany.

CARLTON R. CROYLE, *Primary Examiner.*

MARK M. NEWMAN, *Examiner.*

D. HART, *Assistant Examiner.*